United States Patent
Sun et al.

(10) Patent No.: US 10,892,901 B1
(45) Date of Patent: Jan. 12, 2021

(54) FACIAL DATA COLLECTION AND VERIFICATION

(71) Applicant: Advanced New Technologies Co., Ltd., Grand Cayman (KY)

(72) Inventors: Xi Sun, Hangzhou (CN); Hongwei Luo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/806,959

(22) Filed: Mar. 2, 2020

Related U.S. Application Data

(63) Continuation of application No. PCT/CN2020/071576, filed on Jan. 11, 2020.

(30) Foreign Application Priority Data

Jul. 5, 2019 (CN) .......................... 2019 1 0604901

(51) Int. Cl.
*H04L 9/32* (2006.01)
*G06F 21/32* (2013.01)
(Continued)

(52) U.S. Cl.
CPC ........ *H04L 9/3263* (2013.01); *G06K 9/00255* (2013.01); *G06K 9/00906* (2013.01);
(Continued)

(58) Field of Classification Search
CPC ... H04L 9/3263; H04L 9/0866; H04L 9/0869; H04L 9/3231; G06K 9/00255; G06K 9/00906
See application file for complete search history.

(56) References Cited

U.S. PATENT DOCUMENTS

2010/0191967 A1* 7/2010 Fujii .................. H04L 63/0861
                                                713/169
2018/0218139 A1* 8/2018 Tussy ...................... G06K 9/22

FOREIGN PATENT DOCUMENTS

CN    105933280    9/2016
CN    107196765    9/2017
(Continued)

OTHER PUBLICATIONS

PCT International Search Report and Written Opinion in International Application No. PCT/CN2020/071576, dated Apr. 1, 2020, 19 pages (with machine translation).
(Continued)

*Primary Examiner* — Noura Zoubair
(74) *Attorney, Agent, or Firm* — Fish & Richardson P.C.

(57) ABSTRACT

The present application provides a facial data collection and verification solution. In this solution, after collecting a face sample, a collection device uses the face sample and check data including a random number as to-be-signed data, performs signature by using a device private key, to obtain a facial data signature, and then obtains trusted facial data based on the to-be-signed data, the facial data signature, and a digital certificate that includes a device public key. When performing verification on the trusted facial data, a facial recognition server sequentially performs verification on the digital certificate that includes the device public key, the facial data signature, and the check data. Because content used for the verification process is added for the face sample on the collection device, subsequent verification cannot succeed if a transmitted communication packet is replaced by an attacker. Therefore, a replay attack is prevented at the collection source.

9 Claims, 7 Drawing Sheets

(51) Int. Cl.
    *G06F 21/34*    (2013.01)
    *H04L 9/08*    (2006.01)
    *G06K 9/00*    (2006.01)

(52) U.S. Cl.
    CPC .......... *H04L 9/0866* (2013.01); *H04L 9/0869* (2013.01); *H04L 9/3231* (2013.01)

(56) References Cited

FOREIGN PATENT DOCUMENTS

| | | |
|---|---|---|
| CN | 110380864 | 10/2019 |
| WO | WO2016183380 | 11/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

FACIAL DATA COLLECTION AND VERIFICATION

CROSS-REFERENCE TO RELATED APPLICATIONS

This application is a continuation of PCT Application No. PCT/CN2020/071576, filed on Jan. 11, 2020, which claims priority to Chinese Patent Application No. 201910604901.4, filed on Jul. 5, 2019, and each application is hereby incorporated by reference in its entirety.

TECHNICAL FIELD

The present application relates to the field of information technologies, and in particular, to facial data collection and verification methods, devices, and systems.

BACKGROUND

With the development of information technologies, a facial recognition technology is used in more scenarios. When the facial recognition technology is used, facial data first needs to be collected, and then the collected facial data is sent to a processing device for facial recognition.

SUMMARY

An objective of the present application is to provide a facial data collection and verification solution, so as to alleviate a problem that a replay attack cannot be prevented at a collection source in an existing solution.

Some implementations of the present application provide a facial data collection method, where the method includes the following: obtaining, by a collection device, a random number that is generated by a facial recognition server and corresponds to current facial data collection, and collecting a face sample; using, by the collection device, the face sample and check data as to-be-signed data, and performing signature by using a device private key allocated to the collection device in advance, to obtain a facial data signature, where the check data includes the random number; and obtaining, by the collection device, trusted facial data based on the to-be-signed data, the facial data signature, and a digital certificate that includes a device public key.

Some implementations of the present application further provide a facial data verification method, where the method includes the following: generating, by a facial recognition server, a random number corresponding to current facial data collection, and providing the random number to a collection device, so that the collection device generates trusted facial data including the random number; obtaining, by the facial recognition server, the trusted facial data generated by the collection device, where the trusted facial data includes to-be-signed data, a facial data signature, and a digital certificate that includes a device public key, the to-be-signed data includes a face sample collected by the collection device and check data, the check data includes the random number, and the facial data signature is obtained by the collection device by performing signature by using a device private key allocated to the collection device in advance; performing, by the facial recognition server, certificate verification on the digital certificate that includes the device public key; after the certificate verification succeeds, performing, by the facial recognition server, signature verification on the facial data signature by using the device public key in the digital certificate; and after the signature verification succeeds, comparing, by the facial recognition server, the random number included in the check data and the random number that is stored after being generated, and determining that the check data is verified based on a comparison result of "same".

Some implementations of the present application further provide a facial data collection and verification method, where the method includes the following: generating, by a facial recognition server, a random number corresponding to current facial data collection, and providing the random number to a collection device; obtaining, by the collection device, the random number, and collecting a face sample; using, by the collection device, the face sample and check data as to-be-signed data, and performing signature by using a device private key allocated to the collection device in advance, to obtain a facial data signature, where the check data includes the random number; obtaining, by the collection device, trusted facial data based on the to-be-signed data, the facial data signature, and a digital certificate that includes a device public key; obtaining, by the facial recognition server, the trusted facial data generated by the collection device, and performing certificate verification on the digital certificate that includes the device public key in the trusted facial data; after the certificate verification succeeds, performing, by the facial recognition server, signature verification on the facial data signature by using the device public key in the digital certificate; and after the signature verification succeeds, comparing, by the facial recognition server, the random number included in the check data and the random number that is stored after being generated, and determining that the check data is verified based on a comparison result of "same".

Some implementations of the present application further provide a collection device used for facial data collection, where the collection device includes the following: a data receiving apparatus, configured to obtain a random number that is generated by a facial recognition server and corresponds to current facial data collection; a video collection module, configured to collect a face sample; and a face output module, configured to use the face sample and check data as to-be-signed data, perform signature by using a device private key allocated to the collection device in advance, to obtain a facial data signature, and obtain trusted facial data based on the to-be-signed data, the facial data signature, and a digital certificate that includes a device public key, where the check data includes the random number.

Some implementations of the present application further provide a facial recognition server used for facial data verification, where the facial recognition server includes the following: a data transceiver module, configured to provide a random number corresponding to current facial data collection to a collection device, so that the collection device generates trusted facial data including the random number; and obtain the trusted facial data generated by the collection device, where the trusted facial data includes to-be-signed data, a facial data signature, and a digital certificate that includes a device public key, the to-be-signed data includes a face sample collected by the collection device and check data, the check data includes the random number, and the facial data signature is obtained by the collection device by performing signature by using a device private key allocated to the collection device in advance; and a data processing module, configured to generate the random number, perform certificate verification on the digital certificate that includes the device public key, and after the certificate verification succeeds, perform signature verification on the facial data signature by using the device public key in the digital certificate; and after the signature verification succeeds, compare the random number included in the check data with the random number that is stored after being generated, and determine that the check data is verified based on a comparison result of "same".

Some implementations of the present application further provide a facial data collection and verification system, where the system includes the following: a collection device, configured to obtain a random number corresponding to current facial data collection, and collect a face sample; use the face sample and check data as to-be-signed data, and perform signature by using a device private key allocated to the collection device in advance, to obtain a facial data signature, where the check data includes the random number; and obtain trusted facial data based on the to-be-signed data, the facial data signature, and a digital certificate that includes a device public key; and a facial recognition server, configured to generate the random number, and provide the random number to the collection device; obtain the trusted facial data generated by the collection device, and perform certificate verification on the digital certificate that includes the device public key in the trusted facial data; after the certificate verification succeeds, perform signature verification on the facial data signature by using the device public key in the digital certificate; and after the signature verification succeeds, compare the random number included in the check data with the random number that is stored after being generated, and determine that the check data is verified based on a comparison result of "same".

Some implementations of the present application further provide a computing device, where the device includes a memory configured to store a computer program instruction and a processor configured to execute the computer program instruction, and the device is triggered to perform the previously described method when the processor executes the computer program instruction.

In addition, some implementations of the present application further provide a computer readable medium, where the computer readable medium stores a computer program instruction, and the computer readable instruction can be executed by a processor to implement the previously described method.

According to the solution provided in the implementations of the present application, after collecting a face sample, a collection device uses the face sample and check data including a random number as to-be-signed data, performs signature by using a device private key, to obtain a facial data signature, and then obtains trusted facial data based on the to-be-signed data, the facial data signature, and a digital certificate that includes a device public key. When performing verification on the trusted facial data generated by the collection device, a facial recognition server sequentially performs verification on the digital certificate that includes the device public key, the facial data signature, and the check data. After the verification succeeds, the verification process is completed, so that service processing can be performed on the face sample. In this solution, because content used for the verification process is added for the face sample on the collection device, the random number included in the content only corresponds to current facial data collection, so that security is effectively improved, and subsequent verification cannot succeed if a transmitted communication packet is replaced by an attacker. Therefore, a replay attack is prevented at the collection source.

BRIEF DESCRIPTION OF DRAWINGS

Other features, objectives, and advantages of the present application become more apparent by reading detailed descriptions of the non-limitative implementations with reference to the following accompanying drawings.

Same or similar reference numerals in the accompanying drawings represent same or similar components.

DESCRIPTION OF IMPLEMENTATIONS

Figure 1:
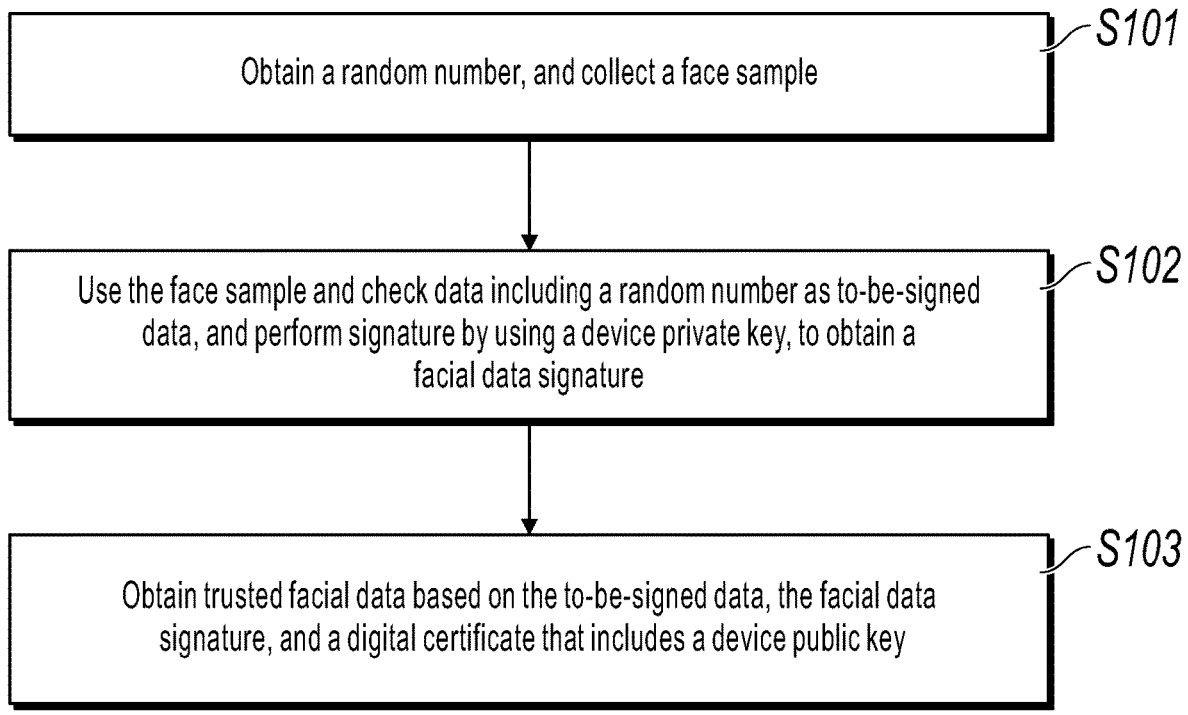
FIG. 1 is a flowchart illustrating processing when a collection device implements a facial data collection method, according to some implementations of the present application.

The following further describes the present application in detail with reference to accompanying drawings.

In a typical configuration of the present application, an end-user device and a network serving device each include one or more central processing units (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program apparatus, or other data. A computer storage medium includes but is not limited to a phase-change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

Implementations of the present application provide a facial data collection and verification method. A collection device collects facial data, and a facial recognition server performs verification on the facial data. According to this solution, because content used for the verification process is added for a face sample on the collection device, subsequent verification cannot succeed if a transmitted communication packet is replaced by an attacker. Therefore, a replay attack is prevented at the collection source.

In a current solution, there is still a risk of facial data replay attack. To be specific, an attacker may use facial data intercepted in a previous transaction or facial data of a user obtained through another channel for replacement in a facial recognition communication packet, so as to pretend to be the user and deceive a recognition device. In a current solution, packet integrity is protected to prevent such a case. For example, a packet signature is used, or a Media Access Control (MAC) address of a packet is calculated. However, a replay attack cannot be prevented at a collection source in this way, and a security risk still exists.

In an actual scenario, the collection device can be an electronic device that has a video collection function and an information processing function, for example, a device that includes a camera and a data processing chip. The camera can be a common camera that can collect a color image, or can be a camera that can collect extra information such as depth information and infrared information. During implementation, the facial recognition server can include but is not limited to a single network server, a set of multiple network servers, or a computer set based on cloud computing, and can be configured to implement some processing functions of setting an alarm clock. Here, the cloud includes a large quantity of hosts or network servers. The cloud computing is a type of distributed computing, and it is a virtual computer including a group of loosely coupled computer sets.

FIG. 1 shows a process of processing when a collection device implements a facial data collection method, according to some implementations of the present application. The process includes the following processing steps.

S101: The collection device obtains a random number that is generated by a facial recognition server and corresponds to current facial data collection, and collects a face sample. The face sample can be at least one of video data and 3D facial data that include a face image, and can be obtained by using various apparatuses with a video collection function, for example, an RGB camera and a depth camera.

In some implementations of the present application, data directly collected by a camera can be used as an original face sample, then at least one of quality assessment and liveness detection is performed on the original sample, and an original sample succeeding in at least one of the quality assessment and the liveness detection is used as the face sample. The quality assessment means assessing quality of the original face sample, so that it is determined whether the collected data satisfies a requirement for subsequent facial recognition processing. After quality assessment is performed on the image, no facial recognition is performed on a face sample that does not satisfy the recognition requirement, so that accuracy of subsequent facial recognition processing can be improved. In an actual scenario, quality assessment can be performed based on a proportion of a face image area in an entire image area, definition of a face image, integrity of a face included in the image, a posture and an angle of the face, a lighting condition of the face, etc., and it is determined whether the quality assessment items satisfy requirements by using specified thresholds. If the requirements are satisfied, it is determined that the quality assessment succeeds; or if the requirements are not satisfied, it is determined that the quality assessment fails. For example, in this implementation, the quality assessment items can be set to the following: The proportion of the face image area in the entire image area is greater than 60%, a face integrity degree is greater than 90%, and an angle between a face front and a lens is less than 20°. If the collected original sample satisfies the thresholds, it can be considered that the original sample succeeds in the quality assessment.

The liveness detection is used to determine whether the collected original sample is from a user himself instead of a prosthesis such as a picture, a video, or a mask held by an attacker, so that security is further improved. In an actual scenario, liveness detection can be performed in different ways based on different application scenarios. For example, if a camera used to collect the original sample can obtain only two-dimensional image data, action-assisted liveness detection can be used, and an output apparatus such as a display prompts the user to perform a corresponding action. Because a prosthesis usually cannot perform a corresponding action based on a prompt, it can be determined whether the user has performed the corresponding action within a predetermined time based on the two-dimensional image data, so as to determine whether the collected original sample is from the user himself. If the camera used to collect the original sample can further collect infrared information, depth information, etc., liveness detection using an infrared or depth image can be used.

In this implementation of the present application, both quality assessment and liveness detection can be used based on a requirement of an actual application scenario, or only one of them can be used. For example, in this implementation, both quality assessment and liveness detection are performed on the original sample. The original face sample is used as a face sample for subsequent processing only after the original face sample succeeds in both the quality assessment and the liveness detection. Otherwise, an original sample can be re-collected until quality assessment and liveness detection succeed.

S102: The collection device uses the face sample and check data as to-be-signed data, and performs signature by using a device private key allocated to the collection device in advance, to obtain a facial data signature. The check data is used in a subsequent verification process, and can include the random number that is generated by the facial recognition server and corresponds to the current facial data collection. A random number generated each time corresponds to one time of facial data collection and verification. For example, after generating one random number RN1, the facial recognition server provides random number RN1 to the collection device correspondingly. After the collection device successfully collects one face sample F1, random number RN1 and face sample F1 collected this time are used as to-be-signed data. When the collection device performs the next collection, random number RN1 is no longer used, but a new random number RN2 generated by the facial recognition server is obtained. Therefore, after generating random number RN1, the facial recognition server stores random number RN1. After obtaining trusted facial data corresponding to face sample F1, the facial recognition server can compare a random number in the trusted facial data with the stored random number. If the random numbers are RN1, verification succeeds; otherwise, it can be considered that the obtained data is insecure, and verification fails.

In some other implementations of the present application, the check data can further include a device identifier allocated to the collection device in advance. Therefore, both the random number and the device identifier can be used as content of the check data. The device identifier corresponds to the collection device. The device identifier can be allocated to the collection device in advance in the following way: The device identifier is written into the collection device by a manufacturer in a secure way when the collection device is delivered from a factory; or the user performs registration, application, etc. when the collection device is initialized. Each collection device can have a unique device identifier. In other words, device identifiers are in a one-to-one correspondence with collection devices. Therefore, after the device identifier of the collection device is used as one piece of content in the check data, the facial recognition server can obtain and store the device identifier of the collection device in another way. After obtaining the trusted facial data corresponding to face sample F1, the facial recognition server can compare a device identifier in the trusted facial data with the pre-stored device identifier. If both are ID1, verification succeeds; otherwise, it can be considered that the obtained data is insecure, and verification fails.

Figure 2:
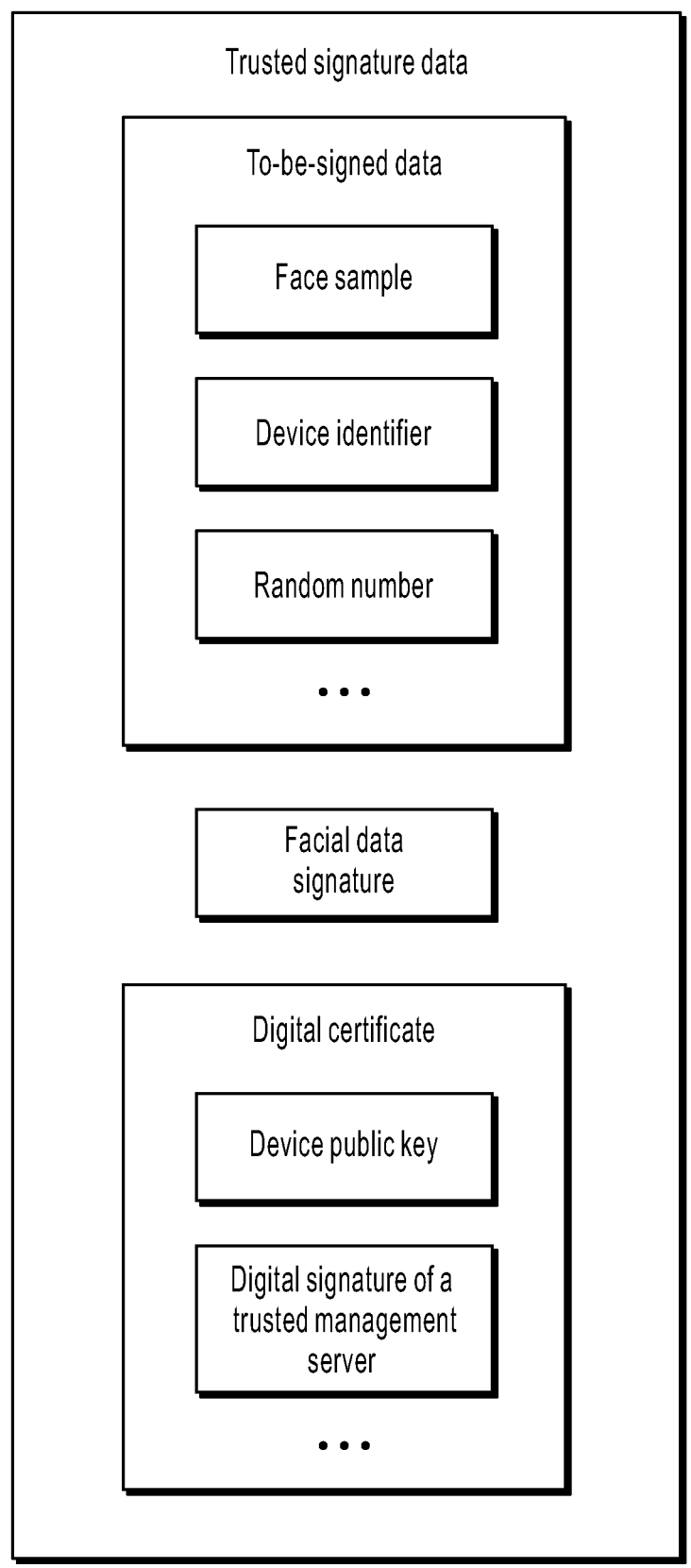
FIG. 2 is a schematic diagram illustrating data composition of trusted facial data, according to some implementations of the present application.

S103: The collection device obtains trusted facial data based on the to-be-signed data, the facial data signature, and a digital certificate that includes a device public key. For example, when the to-be-signed data includes the face sample, the device identifier, and the random number, data composition of the trusted facial data can be shown in FIG. 2.

The digital certificate that includes the device public key can be from a trusted management server, and the trusted management server can be a server of a certificate authority (CA), and can be configured to prove that the device public key in the digital certificate is valid and trusted.

In some implementations of the present application, after generating the trusted facial data, the collection device can provide the trusted facial data to the facial recognition server, so that the facial recognition server performs verification on the trusted facial data.

In an actual scenario, the collection device can trigger facial data collection based on a collection invoking instruction sent by a local service terminal. The local service terminal can be a device having functions such as facial verification and facial registration. After the user performs a specific operation on the local service terminal, a corresponding service processing process is enabled. For example, after the user clicks a button, a service processing process of facial registration is enabled. In this case, the local service terminal generates a corresponding service request. The service request can include the collection invoking instruction, and the collection device can be triggered to perform the facial data collection method after the collection invoking instruction is sent to the collection device.

In addition, after enabling the service processing process of facial registration, the local service terminal requests a random number from the facial recognition server, and the facial recognition server generates a random number based on the random number acquisition request and returns the random number to the local service terminal. The service request sent by the local service terminal to the collection device can also include the random number, so that the collection device can add the random number to the trusted facial data, to implement the subsequent verification process. To be specific, when obtaining the random number that is generated by the facial recognition server and corresponds to the current facial data collection and collecting the face sample, the collection device can obtain the collection invoking instruction and the random number corresponding to the current facial data collection that are sent by the local service terminal, and collect the face sample based on the collection invoking instruction. The collection invoking instruction is generated after the local service terminal obtains a facial recognition service request initiated by the user, the random number is generated by the facial recognition server, and the local service terminal requests to obtain the random number from the facial recognition server after obtaining the facial recognition service request initiated by the user.

Figure 3:
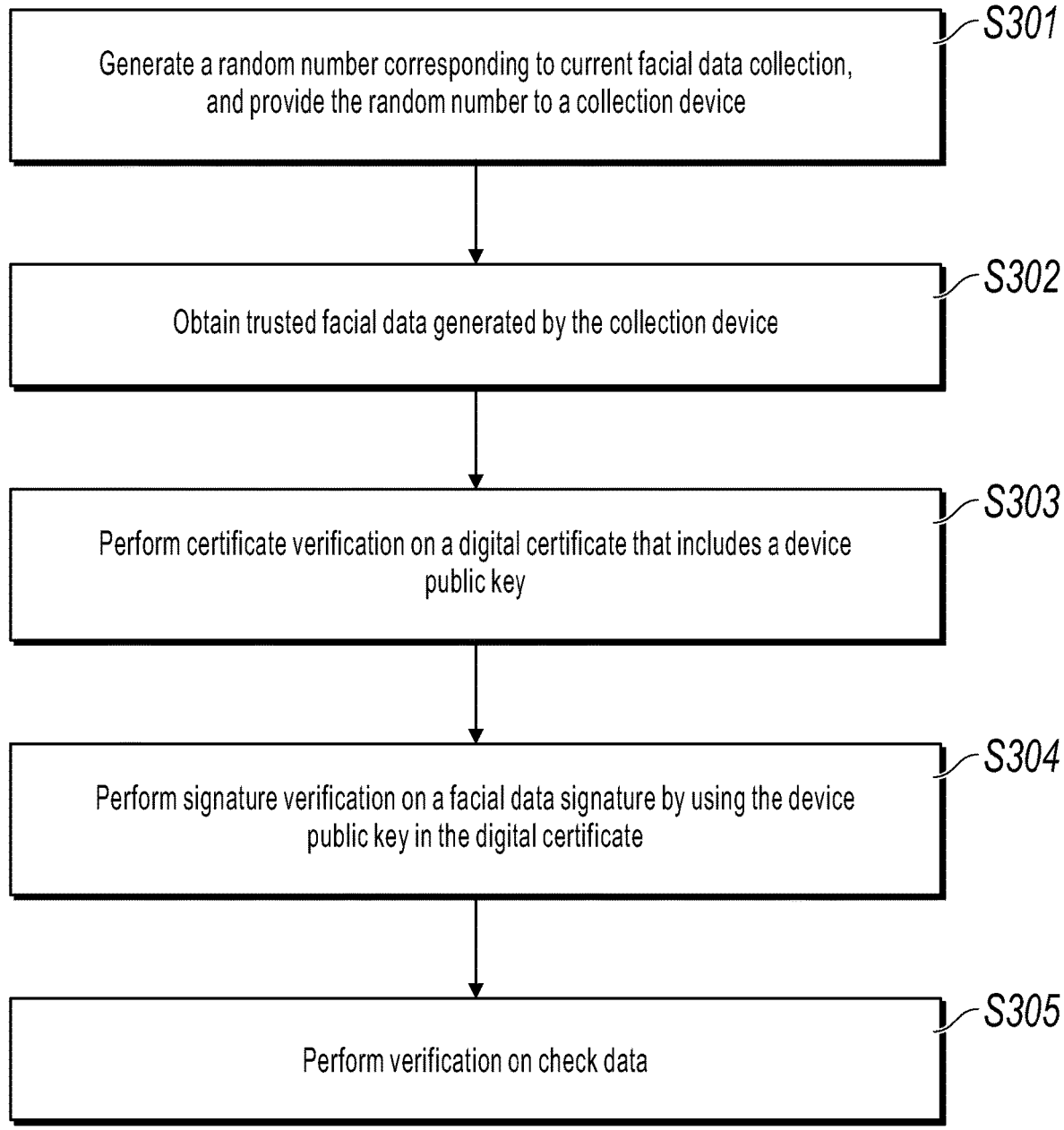
FIG. 3 is a flowchart illustrating processing when a facial recognition server implements a facial data verification method, according to some implementations of the present application.

FIG. 3 shows a process of processing when a facial recognition server implements a facial data verification method, according to some implementations of the present application. The process includes the following processing steps.

S301: The facial recognition server generates a random number corresponding to current facial data collection, and provides the random number to a collection device, so that the collection device generates trusted facial data including the random number.

S302: The facial recognition server obtains the trusted facial data generated by the collection device. For the process of generating the trusted facial data, references can be made to the previously described content. Details are omitted here for simplicity. The trusted facial data includes to-be-signed data, a facial data signature, and a digital certificate that includes a device public key, the to-be-signed data includes a face sample collected by the collection device and check data, the check data includes the random number, and the facial data signature is obtained by the collection device by performing signature by using a device private key allocated to the collection device in advance.

S303: The facial recognition server performs certificate verification on the digital certificate that includes the device public key. The device public key and the device private key are one key pair, and can be generated in advance and used in a facial data collection and verification process. The digital certificate that includes the device public key can be from a trusted management server, and the trusted management server can be a server of a CA, and can be configured to prove that the device public key in the digital certificate is valid and trusted.

Content of the digital certificate can include the to-be-signed data that includes at least the device public key, and a digital signature obtained after the to-be-signed data is signed by using a private key of the trusted management server. During verification, the facial recognition server can obtain a public key of the trusted management server in advance, decrypt the digital signature in the digital certificate by using the public key of the trusted management server, to obtain an original digital signature, and then compare the original digital signature with the to-be-signed data that is included in the digital certificate and includes at least the device public key. If both are consistent, it indicates that the digital certificate is verified. In addition, if hash calculation is performed on the to-be-signed data including the device public key before the to-be-signed data is processed by using the private key of the trusted management server, the original digital signature obtained through decryption by using the public key of the trusted management server during verification is a digest obtained after the hash calculation. In this case, the facial recognition server needs to perform calculation on the to-be-signed data that is included in the digital certificate and includes at least the device public key by using the same hash algorithm. After a digest is obtained, the digest is compared with the digest obtained through decryption by using the public key of the trusted management server. If both are consistent, it indicates that the digital certificate is verified.

S304: After the certificate verification succeeds, the facial recognition server performs signature verification on the facial data signature by using the device public key in the digital certificate. Because the facial data signature in the trusted facial data is obtained by encrypting the to-be-signed data by using the device private key, original data, namely, the to-be-signed data including the face sample and the check data, can be obtained theoretically by decrypting the facial data signature by using the device public key. Therefore, the verification process of the facial data signature is similar to the verification process of the digital certificate, and details are omitted here for simplicity. The difference lies in that a key used in the verification process of the data signature is the device public key whereas a key used in the verification process of the digital certificate is the public key of the trusted management server. After the facial data signature verification succeeds, it can be considered that the to-be-signed data in the trusted facial data, namely, the face sample and the check data, is valid and trusted, and can be used for subsequent processing.

S305: After the signature verification succeeds, the facial recognition server performs verification on the check data. In some implementations of the present application, the check data includes the random number that is generated by the facial recognition server and corresponds to the current facial data collection. Therefore, the facial recognition server can perform verification on the check data by using the random number in the check data. To be specific, the facial recognition server compares the random number included in the check data with the random number that is stored after being generated, and determines that the check data is verified based on a comparison result of "same".

In some other implementations of the present application, if both the random number and the device identifier are used for verification, the facial recognition server compares the random number included in the check data with the random number that is stored after being generated, and compares the device identifier included in the check data with the pre-stored device identifier of the collection device. If both comparison results are "same", the facial recognition server determines that the check data is verified.

In an actual scenario, the random number used for verification is generated based on the random number acquisition request sent by the local service terminal after the facial recognition server receives the random number acquisition request, and the random number is returned to the local service terminal. Therefore, when generating the random number corresponding to the current facial data collection, and providing the random number to the collection device, the facial recognition server can receive the random number acquisition request sent by the local service terminal, then generate the random number corresponding to the current facial data collection based on the random number acquisition request, and return the random number to the local service terminal, so that the local service terminal provides the random number to the collection device.

Figure 4:
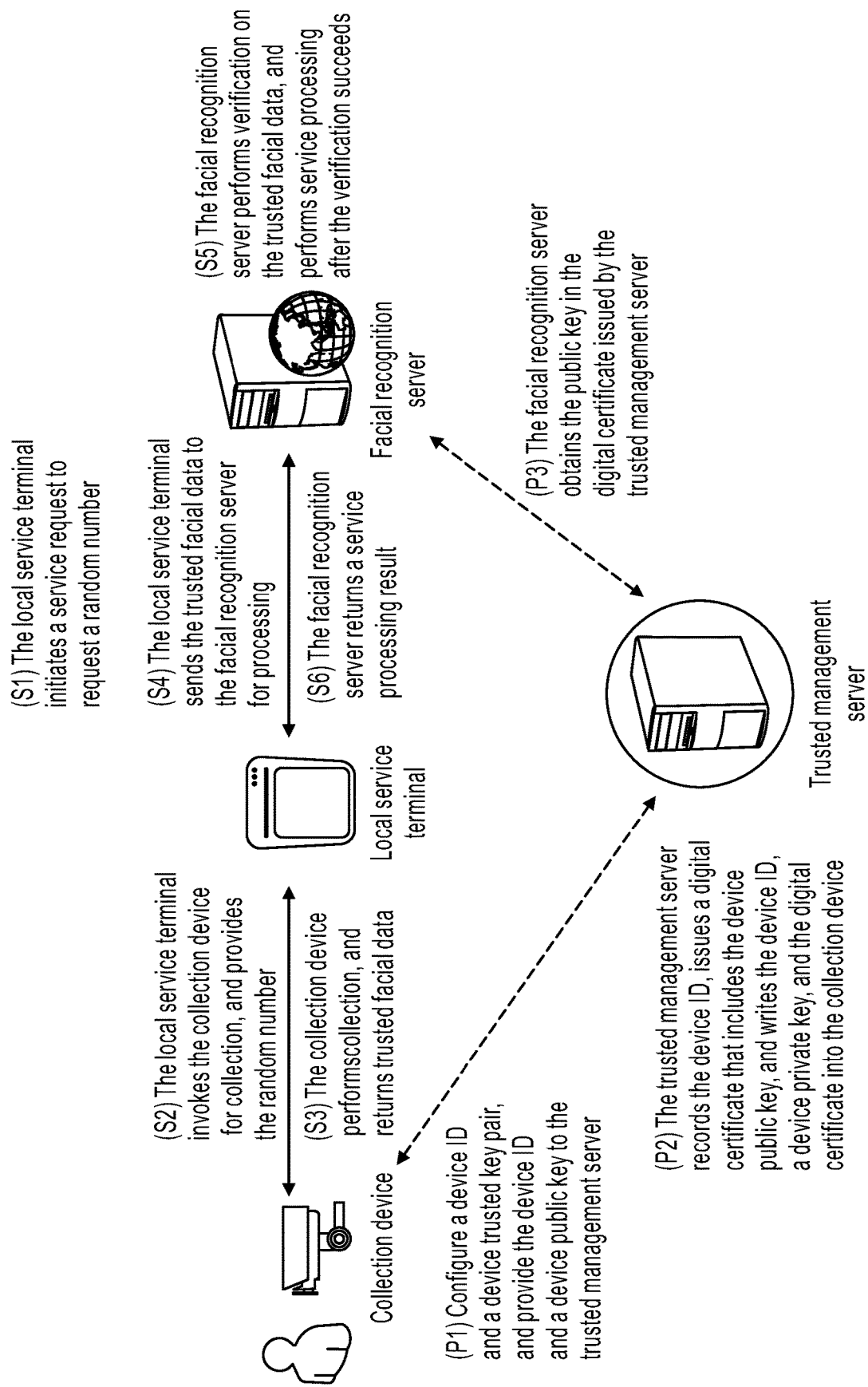
FIG. 4 is a flowchart illustrating interaction between devices when facial data collection and verification are implemented by using the solution provided in the implementations of the present application.

FIG. 4 shows a process of interaction between devices when facial data collection and verification are implemented by using the solution provided in the implementations of the present application. A specific process includes a preparation phase and an execution phase. A process of the preparation phase is as follows:

(P1) Configure a device identifier (ID) and a device trusted key pair for a collection device, where device IDs are in a one-to-one correspondence with collection devices, and each collection device can have one device trusted key pair, or a batch of collection devices share one device trusted key pair. Before the execution phase, the device ID and a device public key in the device trusted key pair corresponding to the device ID are uploaded to a trusted management server.

(P2) When the collection device is delivered from the factory, write a device ID corresponding to each collection device into the collection device to uniquely identify the collection device. In addition, a device private key in a device trusted key pair and a corresponding device public key certificate need to be written into the collection device.

(P3) A facial recognition server obtains, from the trusted management server, a public key corresponding to a private key used by the facial recognition server to issue a device public key certificate.

A process of the execution phase is as follows:

(S1) A user initiates a service request on a local service terminal. For example, in an actual scenario, the service request can be a service request of facial authentication, facial recognition, etc. that need to be implemented based on facial data. The local service terminal requests a random number from the facial recognition server.

(S2) The local service terminal invokes the collection device to perform face collection on a user, and sends the random number to the collection device.

(S3) The collection device collects an original face sample of the user, performs quality determining and liveness detection on the original face sample, uses the original face sample as a face sample, and performs signature on information such as the face sample, the device identifier, and the uploaded random number by using the device private key, to obtain a facial data signature. Then the collection device obtains the trusted facial data by using the facial data signature and a digital certificate including the device public key, and returns the trusted facial data to the local service terminal.

(S4) The local service terminal sends the obtained trusted facial data to the facial recognition server for processing.

(S5) The facial recognition server performs verification on the trusted facial data. Specifically, the facial recognition server first performs verification on validity of the digital certificate included in the trusted facial data by using a public key of the trusted management server. If the verification succeeds, verification is performed on validity of the facial data signature in the trusted facial data by using the device public key in the digital certificate. If the verification succeeds, it is verified whether the random number in the trusted facial data is consistent with the random number that is generated and stored by the facial recognition server. If both are consistent, it is considered that the verification succeeds, and the face sample in the trusted facial data can be used for subsequent service process, for example, facial registration or facial recognition.

(S6) The facial recognition server returns a processing result, for example, whether a result of facial registration or facial recognition succeeds, to the local service terminal.

Figure 5:
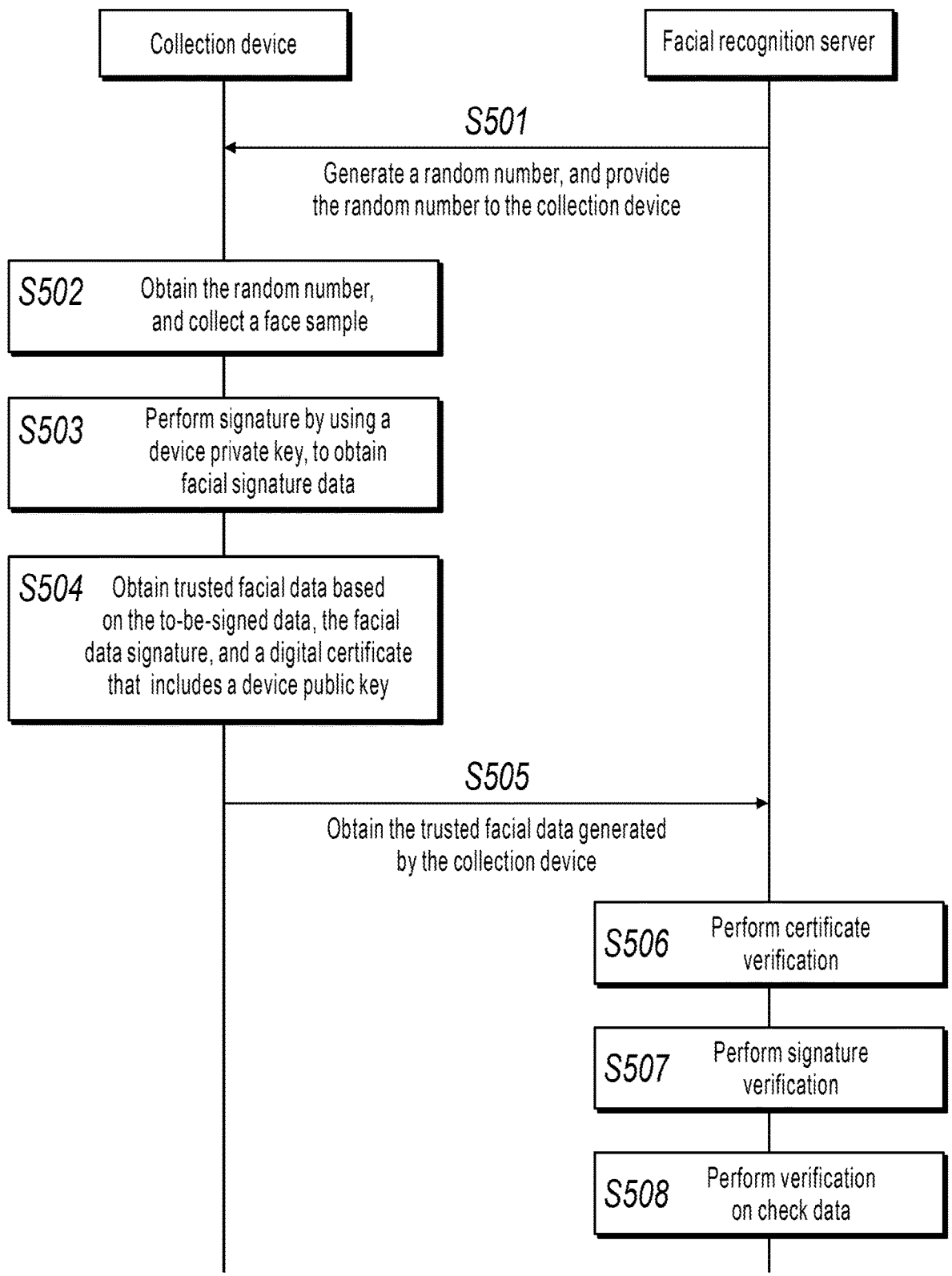
FIG. 5 is a processing flowchart illustrating a facial data collection and verification method, according to some implementations of the present application.

Based on the previously described facial data collection solution and verification solution, some implementations of the present application further provide a facial data collection and verification method. A process of interaction between a facial recognition server and a collection device in the method is shown in FIG. 5, and includes the following steps:

S501: The facial recognition server generates a random number corresponding to current facial data collection, and provides the random number to the collection device.

S502: The collection device obtains the random number, and collects a face sample.

S503: The collection device uses the face sample and check data as to-be-signed data, and performs signature by using a device private key allocated to the collection device in advance, to obtain a facial data signature, where the check data includes the random number.

S504: The collection device obtains trusted facial data based on the to-be-signed data, the facial data signature, and a digital certificate that includes a device public key.

S505: The facial recognition server obtains the trusted facial data generated by the collection device.

S506: The facial recognition server performs certificate verification on the digital certificate that includes the device public key in the trusted facial data.

S507: After the certificate verification succeeds, the facial recognition server performs signature verification on the facial data signature by using the device public key in the digital certificate.

S508: After the signature verification succeeds, the facial recognition server compares the random number included in the check data and the random number that is stored after being generated, and determines that the check data is verified based on a comparison result of "same".

Figure 6:
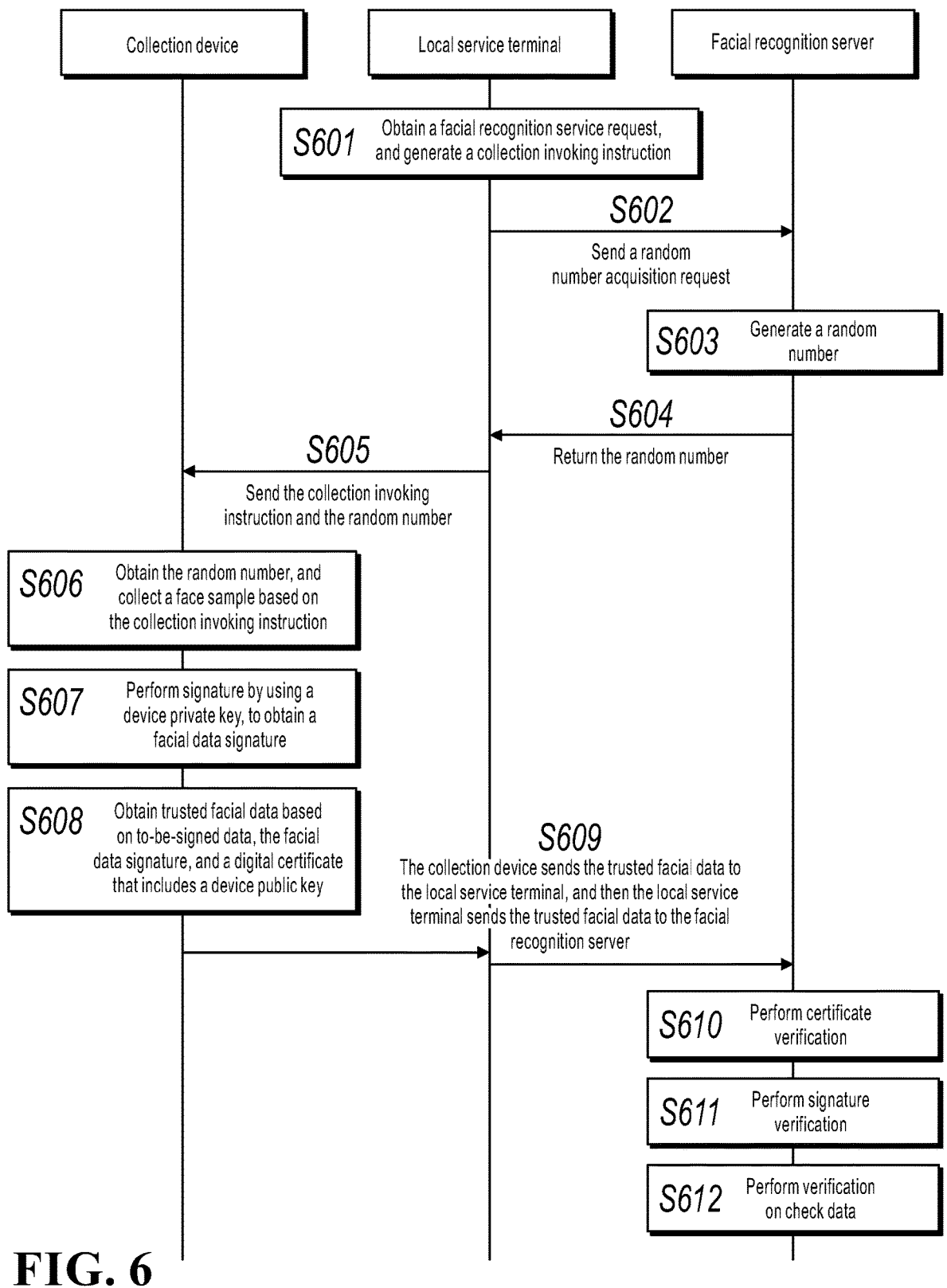
FIG. 6 is a processing flowchart illustrating another facial data collection and verification method, according to some implementations of the present application.

In some implementations of the present application, when the facial data collection and verification method is implemented, a local service terminal can be further included. A process of interaction between the local service terminal, a facial recognition server, and a collection device is shown in FIG. 6, and includes the following steps:

S601: The local service terminal obtains a facial recognition service request initiated by a user, and generates a collection invoking instruction based on the facial recognition service request.

S602: The local service terminal sends a random number acquisition request to the facial recognition server.

S603: The facial recognition server generates a random number corresponding to current facial data collection based on the random number acquisition request.

S604: The facial recognition server returns the random number to the local service terminal.

S605: The local service terminal sends the collection invoking instruction and the random number to the collection device.

S606: The collection device obtains the random number, and collects a face sample based on the collection invoking instruction.

S607: The collection device uses the face sample and check data as to-be-signed data, and performs signature by using a device private key allocated to the collection device in advance, to obtain a facial data signature, where the check data includes the random number.

S608: The collection device obtains trusted facial data based on the to-be-signed data, the facial data signature, and a digital certificate that includes a device public key.

S609: The facial recognition server obtains the trusted facial data generated by the collection device. After generating the trusted facial data, the collection device can first send the trusted facial data to the local service terminal, and then the local service terminal sends the trusted facial data to the facial recognition server.

S610: The facial recognition server performs certificate verification on the digital certificate that includes the device public key in the trusted facial data.

S611: After the certificate verification succeeds, the facial recognition server performs signature verification on the facial data signature by using the device public key in the digital certificate.

S612: After the signature verification succeeds, the facial recognition server compares the random number included in the check data and the random number that is stored after being generated, and determines that the check data is verified based on a comparison result of "same".

Based on the same inventive concept, the implementations of the present application further provide a collection device used for facial data collection, a facial recognition server used for facial data verification, and a facial data collection and verification system. Methods corresponding to the collection device, the facial recognition server, and the system are corresponding methods in the previous implementations, and a problem solving principle of the collection device, the facial recognition server, and the system is similar to that of the methods.

A structure of a collection device used for facial data collection provided in some implementations of the present application can include at least a data receiving apparatus, a video collection module, and a face output module. The data receiving apparatus is configured to obtain a random number that is generated by a facial recognition server and corresponds to current facial data collection. The video collection module is configured to collect a face sample. The face output module is configured to use the face sample and check data as to-be-signed data, perform signature by using a device private key allocated to the collection device in advance, to obtain a facial data signature, and obtain trusted facial data based on the to-be-signed data, the facial data signature, and a digital certificate that includes a device public key, where the check data includes the random number.

The face sample can be at least one of video data and 3D facial data that include a face image, and can be obtained by using various apparatuses with a video collection function, for example, an RGB camera and a depth camera.

In some implementations of the present application, data directly collected by a camera can be used as an original face sample, then at least one of quality assessment and liveness detection is performed on the original sample, and an original sample succeeding in at least one of the quality assessment and the liveness detection is used as the face sample. The quality assessment means assessing quality of the original face sample, so that it is determined whether the collected data satisfies a requirement for subsequent facial recognition processing. After quality assessment is performed on the image, no facial recognition is performed on a face sample that does not satisfy the recognition requirement, so that accuracy of subsequent facial recognition processing can be improved. In an actual scenario, quality assessment can be performed based on a proportion of a face image area in an entire image area, definition of a face image, integrity of a face included in the image, a posture and an angle of the face, a lighting condition of the face, etc., and it is determined whether the quality assessment items satisfy requirements by using specified thresholds. If the requirements are satisfied, it is determined that the quality assessment succeeds; or if the requirements are not satisfied, it is determined that the quality assessment fails. For example, in this implementation, the quality assessment items can be set to the following: The proportion of the face image area in the entire image area is greater than 60%, a face integrity degree is greater than 90%, and an angle between a face front and a lens is less than 20°. If the collected original sample satisfies the thresholds, it can be considered that the original sample succeeds in the quality assessment.

The liveness detection is used to determine whether the collected original sample is from a user himself instead of a prosthesis such as a picture, a video, or a mask held by an attacker, so that security is further improved. In an actual scenario, liveness detection can be performed in different ways based on different application scenarios. For example, if a camera used to collect the original sample can obtain only two-dimensional image data, action-assisted liveness detection can be used, and an output apparatus such as a display prompts the user to perform a corresponding action. Because a prosthesis usually cannot perform a corresponding action based on a prompt, it can be determined whether the user has performed the corresponding action within a predetermined time based on the two-dimensional image data, so as to determine whether the collected original sample is from the user himself. If the camera used to collect the original sample can further collect infrared information, depth information, etc., liveness detection using an infrared or depth image can be used.

Therefore, in some implementations of the present application, the video collection module can include a collection unit and a detection and assessment unit. The collection unit is configured to collect an original face sample, and the detection and assessment unit is configured to perform at least one of quality assessment and liveness detection on the original sample, and use an original sample succeeding in at least one of the quality assessment and the liveness detection as the face sample.

In this implementation of the present application, both quality assessment and liveness detection can be used based on a requirement of an actual application scenario, or only one of them can be used. For example, in this implementation, both quality assessment and liveness detection are performed on the original sample. The original face sample is used as a face sample for subsequent processing only after the original face sample succeeds in both the quality assessment and the liveness detection. Otherwise, an original sample can be re-collected until quality assessment and liveness detection succeed.

The face output module is configured to use the face sample and the check data as the to-be-signed data, and perform signature by using the device private key allocated to the collection device in advance, to obtain the facial data signature. The check data is used in a subsequent verification process, and can include the random number that is generated by the facial recognition server and corresponds to the current facial data collection. A random number generated each time corresponds to one time of facial data collection and verification. For example, after generating one random number RN1, the facial recognition server provides random number RN1 to the collection device correspondingly. After the collection device successfully collects one face sample F1, random number RN1 and face sample F1 collected this time are used as to-be-signed data. When the collection device performs the next collection, random number RN1 is no longer used, but a new random number RN2 generated by the facial recognition server is obtained. Therefore, after generating random number RN1, the facial recognition server stores random number RN1. After obtaining trusted facial data corresponding to face sample F1, the facial recognition server can compare a random number in the trusted facial data with the stored random number. If the random numbers are RN1, verification succeeds; otherwise, it can be considered that the obtained data is insecure, and verification fails.

In some other implementations of the present application, the check data can further include a device identifier allocated to the collection device in advance. Therefore, both the random number and the device identifier can be used as content of the check data. The device identifier corresponds to the collection device. The device identifier can be allocated to the collection device in advance in the following way: The device identifier is written into the collection device by a manufacturer in a secure way when the collection device is delivered from a factory; or a user performs registration, application, etc. when the collection device is initialized. Each collection device can have a unique device identifier. In other words, device identifiers are in a one-to-one correspondence with collection devices. Therefore, after the device identifier of the collection device is used as one piece of content in the check data, the facial recognition server can obtain and store the device identifier of the collection device in another way. After obtaining the trusted facial data corresponding to face sample F1, the facial recognition server can compare a device identifier in the trusted facial data with the pre-stored device identifier. If both are ID1, verification succeeds; otherwise, it can be considered that the obtained data is insecure, and verification fails.

After obtaining the to-be-signed data and the facial data signature, the facial output module can obtain the trusted facial data based on the to-be-signed data, the facial data signature, and the digital certificate that includes the device public key. For example, when the to-be-signed data includes the face sample, the device identifier, and the random number, data composition of the trusted facial data can be shown in FIG. 2.

The digital certificate that includes the device public key can be from a trusted management server, and the trusted management server can be a server of a CA, and can be configured to prove that the device public key in the digital certificate is valid and trusted.

In some implementations of the present application, after generating the trusted facial data, the collection device can provide the trusted facial data to the facial recognition server, so that the facial recognition server performs verification on the trusted facial data.

In an actual scenario, the collection device can trigger facial data collection based on a collection invoking instruction sent by a local service terminal. Therefore, in some implementations of the present application, the collection device can further include a data receiving module, and the data receiving module is configured to: before the original face sample is obtained, obtain the collection invoking instruction and the random number corresponding to the current facial data collection that are sent by the local service terminal. The local service terminal can be a device having functions such as facial verification and facial registration. After the user performs a specific operation on the local service terminal, a corresponding service processing process is enabled. For example, after the user clicks a button, a service processing process of facial registration is enabled. In this case, the local service terminal generates a corresponding service request. The service request can include the collection invoking instruction, and the collection device can be triggered to perform the facial data collection method after the collection invoking instruction is sent to the collection device.

In addition, after enabling the service processing process of facial registration, the local service terminal requests a random number from the facial recognition server, and the facial recognition server generates a random number based on the random number acquisition request and returns the random number to the local service terminal. The service request sent by the local service terminal to the collection device can also include the random number, so that the collection device can add the random number to the trusted facial data, to implement the subsequent verification process. To be specific, when obtaining the random number that is generated by the facial recognition server and corresponds to the current facial data collection and collecting the face sample, the collection device can obtain the collection invoking instruction and the random number corresponding to the current facial data collection that are sent by the local service terminal, and collect the face sample based on the collection invoking instruction. The collection invoking instruction is generated after the local service terminal obtains a facial recognition service request initiated by the user, the random number is generated by the facial recognition server, and the local service terminal requests to obtain the random number from the facial recognition server after obtaining the facial recognition service request initiated by the user.

Some implementations of the present application further provide a facial recognition server used for facial data verification, and the facial recognition server can include a data transceiver module and a data processing module. The data transceiver module is configured to provide a random number corresponding to current facial data collection to a collection device, so that the collection device generates trusted facial data including the random number; and obtain the trusted facial data generated by the collection device. For the process of generating the trusted facial data, references can be made to the previously described content. Details are omitted here for simplicity. The trusted facial data includes to-be-signed data, a facial data signature, and a digital certificate that includes a device public key, the to-be-signed data includes a face sample collected by the collection device and check data, the check data includes the random number, and the facial data signature is obtained by the collection device by performing signature by using a device private key allocated to the collection device in advance.

The data processing module is configured to generate the random number, and perform various types of verification based on the trusted facial data, including the following: performing certificate verification on the digital certificate that includes the device public key, performing signature verification on the facial data signature by using the device public key in the digital certificate, and performing check data verification on the check data.

The device public key and the device private key are one key pair, and can be generated in advance and used in a facial data collection and verification process. The digital certificate that includes the device public key can be from a trusted management server, and the trusted management server can be a server of a CA, and can be configured to prove that the device public key in the digital certificate is valid and trusted.

Content of the digital certificate can include the to-be-signed data that includes at least the device public key, and a digital signature obtained after the to-be-signed data is signed by using a private key of the trusted management server. During verification, the facial recognition server can obtain a public key of the trusted management server in advance, decrypt the digital signature in the digital certificate by using the public key of the trusted management server, to obtain an original digital signature, and then compare the original digital signature with the to-be-signed data that is included in the digital certificate and includes at least the device public key. If both are consistent, it indicates that the digital certificate is verified. In addition, if hash calculation is performed on the to-be-signed data including the device public key before the to-be-signed data is processed by using the private key of the trusted management server, the original digital signature obtained through decryption by using the public key of the trusted management server during verification is a digest obtained after the hash calculation. In this case, the facial recognition server needs to perform calculation on the to-be-signed data that is included in the digital certificate and includes at least the device public key by using the same hash algorithm. After a digest is obtained, the digest is compared with the digest obtained through decryption by using the public key of the trusted management server. If both are consistent, it indicates that the digital certificate is verified.

After the certificate verification succeeds, the data processing module of the facial recognition server performs signature verification on the facial data signature by using the device public key in the digital certificate. Because the facial data signature in the trusted facial data is obtained by encrypting the to-be-signed data by using the device private key, original data, namely, the to-be-signed data including the face sample and the check data, can be obtained theoretically by decrypting the facial data signature by using the device public key. Therefore, the verification process of the facial data signature is similar to the verification process of the digital certificate, and details are omitted here for simplicity. The difference lies in that a key used in the verification process of the data signature is the device public key whereas a key used in the verification process of the digital certificate is the public key of the trusted management server. After the facial data signature verification succeeds, it can be considered that the to-be-signed data in the trusted facial data, namely, the face sample and the check data, is valid and trusted, and can be used for subsequent processing.

After the signature verification succeeds, the data processing module of the facial recognition server performs verification on the check data. In some implementations of the present application, the check data includes the random number that is generated by the facial recognition server and corresponds to the current facial data collection. Therefore, the facial recognition server can perform verification on the check data by using the random number in the check data. To be specific, the facial recognition server compares the random number included in the check data with the random number that is stored after being generated, and determines that the check data is verified based on a comparison result of "same".

In some other implementations of the present application, if both the random number and the device identifier are used for verification, the facial recognition server compares the random number included in the check data with the random number that is stored after being generated, and compares the device identifier included in the check data with the pre-stored device identifier of the collection device. If both comparison results are "same", the facial recognition server determines that the check data is verified.

In an actual scenario, the data transceiver module is further configured to receive a random number acquisition request sent by a local service terminal, and return the random number to the local service terminal, so that the local service terminal provides the random number to the collection device; and the data processing module is further configured to generate the random number based on the random number acquisition request. In other words, the random number used for verification is generated based on the random number acquisition request sent by the local service terminal after the facial recognition server receives the random number acquisition request, and the random number is returned to the local service terminal.

In addition, some implementations of the present application further provide a facial data collection and verification system, and the system includes at least a collection device and a facial recognition server.

The collection device is configured to obtain a random number corresponding to current facial data collection, and collect a face sample; use the face sample and check data as to-be-signed data, and perform signature by using a device private key allocated to the collection device in advance, to obtain a facial data signature, where the check data includes the random number; and obtain trusted facial data based on the to-be-signed data, the facial data signature, and a digital certificate that includes a device public key.

The facial recognition server is configured to generate the random number, and provide the random number to the collection device; obtain the trusted facial data generated by the collection device, and perform certificate verification on the digital certificate that includes the device public key in the trusted facial data; after the certificate verification succeeds, perform signature verification on the facial data signature by using the device public key in the digital certificate; and after the signature verification succeeds, compare the random number included in the check data with the random number that is stored after being generated, and determine that the check data is verified based on a comparison result of "same".

In another implementation of the present application, the system can further include a local service terminal. The local service terminal is configured to obtain a facial recognition service request initiated by a user, generate a collection invoking instruction based on the facial recognition service request, and send a random number acquisition request to the facial recognition server; obtain the random number that is generated by the facial recognition server and corresponds to the current facial data collection; and send the collection invoking instruction and the random number to the collection device.

The collection device can collect the face sample based on the collection invoking instruction. When providing the random number, the facial recognition server can generate the random number corresponding to the current facial data collection based on the random number acquisition request, and return the random number to the local service terminal, so that the local service terminal provides the random number to the collection device.

In conclusion, according to the solution provided in this implementation of the present application, after collecting a face sample, a collection device uses the face sample and check data including a random number as to-be-signed data, performs signature by using a device private key, to obtain a facial data signature, and then obtains trusted facial data based on the to-be-signed data, the facial data signature, and a digital certificate that includes a device public key. When performing verification on the trusted facial data generated by the collection device, a facial recognition server sequentially performs verification on the digital certificate that includes the device public key, the facial data signature, and the check data. After the verification succeeds, the verification process is completed, so that service processing can be performed on the face sample. In this solution, because content used for the verification process is added for the face sample on the collection device, the random number included in the content only corresponds to current facial data collection, so that security is effectively improved, and subsequent verification cannot succeed if a transmitted communication packet is replaced by an attacker. Therefore, a replay attack is prevented at the collection source.

Figure 7:
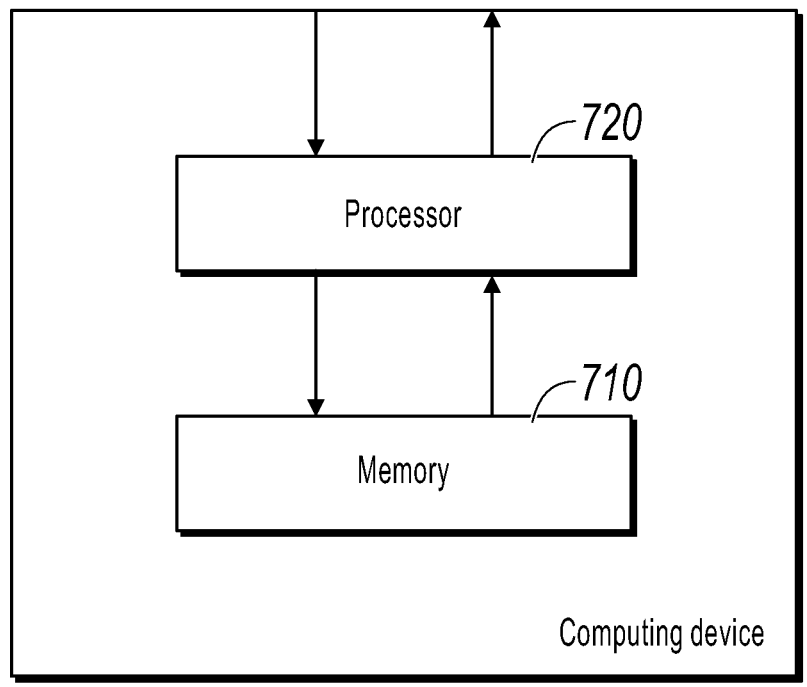
FIG. 7 is a schematic structural diagram illustrating a computing device, according to some implementations of the present application.

In addition, a part of the present application can be implemented as a computer program product such as a computer program instruction. When the computer program instruction is executed by a computer, at least one of the method and the technical solution according to the present application can be invoked or provided through operations of the computer. In addition, the program instruction for invoking the method in the present application can be stored in a fixed or removable recording medium, and/or is transmitted through broadcast or a data flow in other signal bearer media, and/or is stored in an operating memory of a computer device that operates based on the program instruction. Here, some implementations of the present application include a computing device shown in FIG. 7. The device includes one or more memories 710 storing a computer readable instruction and a processor 720 configured to execute the computer readable instruction. When the computer readable instruction is executed by the processor, the device performs at least one of the method and the technical solution in the multiple implementations of the present application described above.

In addition, some implementations of the present application further provide a computer readable medium, where the computer readable medium stores a computer program instruction, and the computer readable instruction can be executed by a processor to implement at least one of the method and the technical solution in the multiple implementations of the present application described above.

It is worthwhile to note that the present application can be implemented in software and/or a combination of software and hardware. For example, the present application can be implemented by using an application-specific integrated circuit (ASIC), a general-purpose computer, or any other similar hardware device. In some implementations, a software program in the present application can be executed by a processor, so as to implement the previously described steps or functions. Similarly, the software program (including a related data structure) in the present application can be stored in a computer readable recording medium, for example, a RAM, a hard disk drive or a DVD-ROM/CD-ROM drive, or a floppy disk and a similar device. In addition, some steps or functions of the present application can be implemented by using hardware, for example, a circuit that cooperates with the processor to perform the steps or the functions.

It is clear to a person skilled in the art that the present application is not limited to the details of the previous example implementations, and the present application can be implemented in another specific form without departing from the spirit or essential feature of the present application. Therefore, the implementations should be considered as illustrative and not restrictive in every aspect, and the scope of the present application is limited by the appended claims, rather than the above description. Therefore, the present application covers all changes within the meaning and the scope of the equivalent elements of the claims. Any reference numeral in the claims should not be considered as a limitation on the related claim. In addition, it is clear that the word "include" does not exclude another unit or step, and the singular does not exclude the plural. Multiple units or apparatuses described in the apparatus claims can be implemented by one unit or apparatus by using software or hardware. The words such as "first" and "second" are used to indicate names instead of any particular order.

What is claimed is:

1. A computer-implemented method comprising:
obtaining, by a collection device, a random number that is generated by a facial recognition server responsive to a request initiated by a user, wherein the random number corresponds to current facial data collection and is stored on the facial recognition server;
obtaining, by the collection device from a local service terminal, a collection invoking instruction corresponding to the current facial data collection, wherein the collection invoking instruction is generated by the local service terminal after the local service terminal obtains a facial recognition service request initiated by the user, and wherein the local service terminal performs facial verification and facial registration;
collecting, by the collection device, a face sample of the user based on the collection invoking instruction;
generating, based on the face sample of the user, a first set of data, wherein the first set of data comprises a device identifier corresponding to the collection device and the random number;
encrypting, by the collection device using a device private key allocated to the collection device, the first set of data to generate a facial data signature;
generating, by the collection device, a digital certificate, wherein the digital certificate comprises a device public key allocated to the collection device, the first set of data, and a digital signature, wherein the digital signature is generated by encrypting the first set of data using a private key of a trusted management server;
generating, by the collection device, trusted facial data, wherein the trusted facial data comprises the first set of data, the facial data signature, and the digital certificate; and
providing the trusted facial data to the facial recognition server, wherein the facial recognition server performs verification on the trusted facial data.

2. The computer-implemented method of claim 1, wherein collecting the face sample comprises:
collecting, by the collection device, one or more original face samples; and
performing, by the collection device, at least one of quality assessment and liveness detection on the one or more original face samples, and using an original sample of the one or more original face samples that satisfies at least one of the quality assessment and the liveness detection as the face sample.

3. The computer-implemented method of claim 1, wherein the random number is generated by the facial recognition server, and the local service terminal requests to obtain the random number from the facial recognition server after the local service terminal obtains the facial recognition service request initiated by the user.

4. A non-transitory, computer-readable medium storing one or more instructions executable by a computer system to perform operations comprising:
obtaining, by a collection device, a random number that is generated by a facial recognition server responsive to a request initiated by a user, wherein the random number corresponds to current facial data collection and is stored on the facial recognition server;
obtaining, by the collection device from a local service terminal, a collection invoking instruction corresponding to the current facial data collection, wherein the collection invoking instruction is generated by the local service terminal after the local service terminal obtains a facial recognition service request initiated by the user, and wherein the local service terminal performs facial verification and facial registration;
collecting, by the collection device, a face sample of the user based on the collection invoking instruction;
generating, based on the face sample of the user, a first set of data, wherein the first set of data comprises a device identifier corresponding to the collection device and the random number;
encrypting, by the collection device using a device private key allocated to the collection device, the first set of data to generate a facial data signature;
generating, by the collection device, a digital certificate, wherein the digital certificate comprises a device public key allocated to the collection device, the first set of data, and a digital signature, wherein the digital signature is generated by encrypting the first set of data using a private key of a trusted management server;
generating, by the collection device, trusted facial data, wherein the trusted facial data comprises the first set of data, the facial data signature, and the digital certificate; and
providing the trusted facial data to the facial recognition server, wherein the facial recognition server performs verification on the trusted facial data.

5. The non-transitory, computer-readable medium of claim 4, wherein collecting the face sample comprises:
collecting, by the collection device, one or more original face samples; and
performing, by the collection device, at least one of quality assessment and liveness detection on the one or more original face samples, and using an original sample of the one or more original face samples that satisfies at least one of the quality assessment and the liveness detection as the face sample.

6. The non-transitory, computer-readable medium of claim 4, wherein the random number is generated by the facial recognition server, and the local service terminal requests to obtain the random number from the facial recognition server after the local service terminal obtains the facial recognition service request initiated by the user.

7. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a collection device, a random number that is generated by a facial recognition server responsive to a request initiated by a user, wherein the random number corresponds to current facial data collection and is stored on the facial recognition server;
obtaining, by the collection device from a local service terminal, a collection invoking instruction corresponding to the current facial data collection, wherein the collection invoking instruction is generated by the local service terminal after the local service terminal obtains a facial recognition service request initiated by the user, and wherein the local service terminal performs facial verification and facial registration;

collecting, by the collection device, a face sample of the user based on the collection invoking instruction;

generating, based on the face sample of the user, a first set of data, wherein the first set of data comprises a device identifier corresponding to the collection device and the random number;

encrypting, by the collection device using a device private key allocated to the collection device, the first set of data to generate a facial data signature;

generating, by the collection device, a digital certificate, wherein the digital certificate comprises a device public key allocated to the collection device, the first set of data, and a digital signature, wherein the digital signature is generated by encrypting the first set of data using a private key of a trusted management server;

generating, by the collection device, trusted facial data, wherein the trusted facial data comprises the first set of data, the facial data signature, and the digital certificate; and providing the trusted facial data to the facial recognition server, wherein the facial recognition server performs verification on the trusted facial data.

8. The computer-implemented system of claim 7, wherein collecting the face sample comprises:

collecting, by the collection device, one or more original face samples; and performing, by the collection device, at least one of quality assessment and liveness detection on the one or more original face samples, and using an original sample of the one or more original face samples that satisfies at least one of the quality assessment and the liveness detection as the face sample.

9. The computer-implemented system of claim 7, wherein the random number is generated by the facial recognition server, and the local service terminal requests to obtain the random number from the facial recognition server after the local service terminal obtains the facial recognition service request initiated by the user.

* * * * *